US007791675B2

(12) United States Patent
Berman

(10) Patent No.: US 7,791,675 B2
(45) Date of Patent: Sep. 7, 2010

(54) METHOD AND APPARATUS FOR VARIABLE RETARDATION AND ADJUSTING LIGHT CHANNEL PATHLENGTHS

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 961 days.

(21) Appl. No.: 11/245,297

(22) Filed: Oct. 5, 2005

(65) Prior Publication Data

US 2007/0076134 A1  Apr. 5, 2007

(51) Int. Cl.
*G02F 1/1335* (2006.01)
(52) U.S. Cl. ...................................................... 349/18
(58) Field of Classification Search ................... None
See application file for complete search history.

(56) References Cited

U.S. PATENT DOCUMENTS

| | | | | |
|---|---|---|---|---|
| 4,101,207 A * | 7/1978 | Taylor | ............... | 349/89 |
| 5,243,455 A * | 9/1993 | Johnson et al. | ............... | 349/18 |
| 5,289,301 A * | 2/1994 | Brewer | ............... | 349/165 |
| 5,347,297 A * | 9/1994 | Gage | ............... | 347/258 |
| 5,347,383 A * | 9/1994 | Fergason | ............... | 345/211 |
| 6,547,396 B1 * | 4/2003 | Svardal et al. | ............... | 353/8 |
| 6,593,985 B1 * | 7/2003 | Taira et al. | ............... | 349/119 |
| 2003/0117707 A1 * | 6/2003 | Uchida et al. | ............... | 359/492 |
| 2003/0151833 A1 * | 8/2003 | Berman et al. | ............... | 359/831 |

* cited by examiner

*Primary Examiner*—David Nelms
*Assistant Examiner*—Lucy P Chien
(74) *Attorney, Agent, or Firm*—Martine Penilla & Gencarella, LLP

(57) ABSTRACT

A variable retarder is inserted in one or more light channels of a kernel. The variable retarder is a nematic liquid crystal layer that is energized by an electric field and, for example, the voltage or frequency of the electric field dictates an amount of retardation effected by the variable retarder. The variable retarder either increases or decreases an optical path in which it is inserted relative to a reference. The amount of increase or decrease is utilized to place light paths in the kernel within acceptable tolerances. The acceptable tolerances are, for example, a tolerance of difference-light paths expected by a projection lens of device using the kernel for light modulation. In one embodiment, the variable retarder includes a polymer that can be used to fix a retardation value of the variable waveplate.

22 Claims, 6 Drawing Sheets

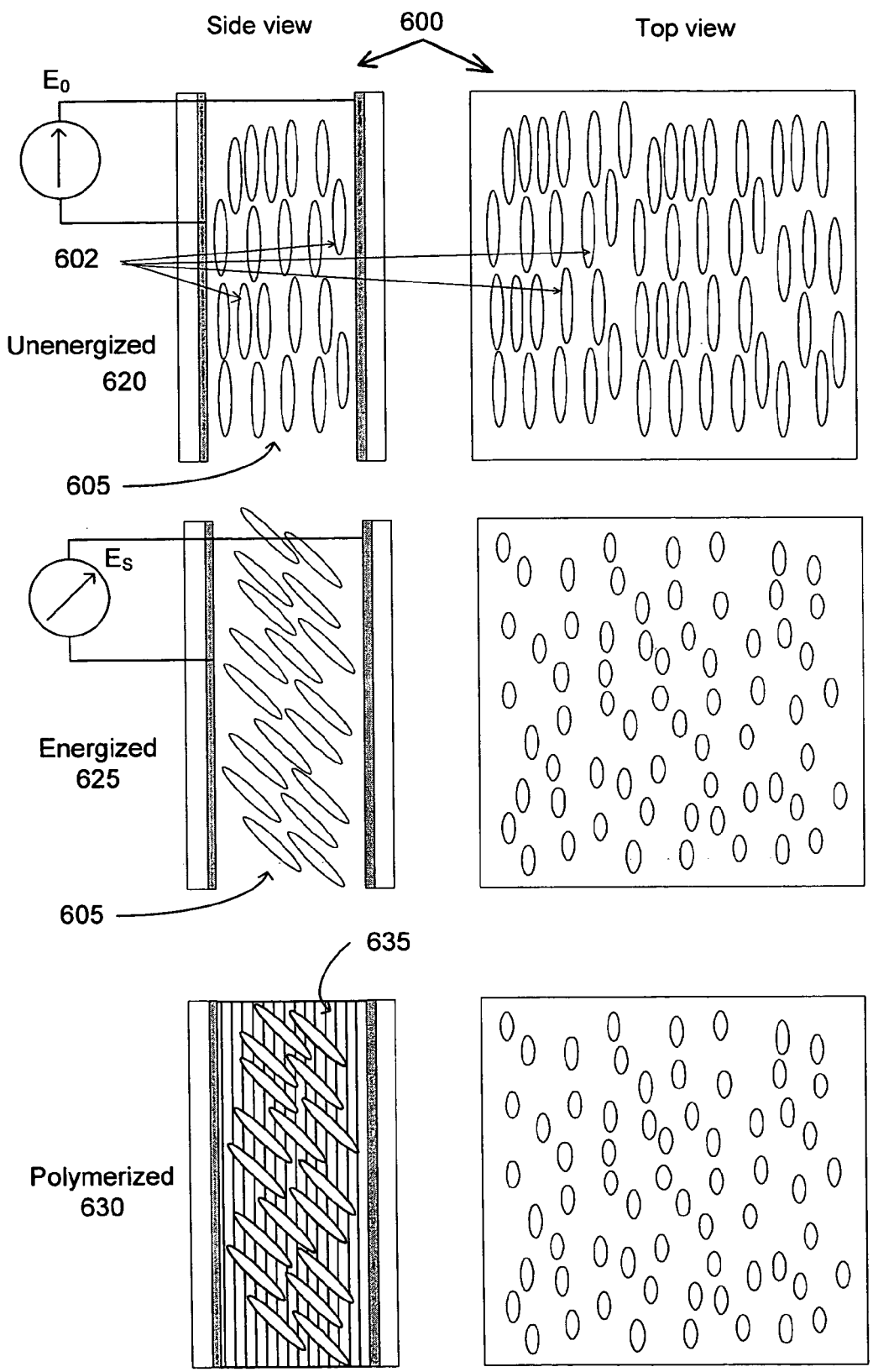

METHOD AND APPARATUS FOR VARIABLE RETARDATION AND ADJUSTING LIGHT CHANNEL PATHLENGTHS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to optics and materials for variable retardation. The present invention is also related to the application of variable retardation to the adjustment of light pathlengths in optical devices such as kernels and prism assemblies of video projection devices, and particularly to adjustment of multiple light pathlengths to target values.

2. Discussion of Background

Light Engines are utilized in optical devices, particularly projection video devices, and generally comprises a light source, condenser, kernel (prism assembly and microdisplays), and projection lens. A display screen and related electronics, for example, are added to produce a video display product. Many different kernels and prism assemblies are commercially available in varying configurations. However, the kernel is the optical heart of the light engine, and is composed of the prism assembly and at least one, and typically three, LCOS microdisplays.

The function of the components of an LCOS based video projector 100 is explained by example of a light engine with reference to FIG. 1. As shown, white light 110 is generated by a light source 105. The light is collected, homogenized and formed into the proper shape and otherwise processed by optics (not all shown for clarity). The light then enters a prism assembly 150 where it is polarized and broken into red, green and blue polarized light beams. A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam modulates the green content of a full color video image. Similarly, the red and blue contents of the full color image are modulated by corresponding "red" and "blue" microdisplays. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

SUMMARY OF THE INVENTION

The present inventor has realized the need to provide variable retardation and utilize a variable retarder to, among other tasks, precisely adjust light paths in optical devices.

The present invention includes a variable retarder, comprising a first substrate, a second substrate, and a variable retarder material disposed between the first substrate and the second substrate. The variable retarder includes, for example, an activation device configured to apply an electric field to the retarder material, the applied electric field varying an amount of retardation effected by the retarder material.

In one embodiment, the variable retarder material may also be set to a fixed retardation value.

In one embodiment, the variable retarder is placed in a first light path of an optical device and adjusts the first light pathlength with respect to a reference or target value. The reference may be a second light path or a second light path adjusted for a design (e.g., achromatic shift) and/or a manufacturing parameter (e.g., variance in part dimensions) of the optical device.

In one embodiment, the present invention comprises an optical device, comprising a kernel, comprising a prism assembly comprising a set of beam splitters and a set of processing faces, the prism assembly configured to separate an input light into a plurality of light beams each corresponding to and individually directed to one of the processing faces and recombine the light beams after modulation into an output beam, a set of reflective microdisplays each individually mounted on one of the processing faces and each microdisplay configured to modulate the light beam corresponding to the processing face on which the microdisplay is mounted, and at least one adjustable retarder material disposed in at least one of the light beams.

The adjustable retarder material is, for example, adjusted via an applied electric field where an amount of retardation imposed on light passing through the waveplate is a function of wavelength of the light and a characteristic of the electric field. The amount of retardation, for example, increases with increased voltage of the electric field and/or varies depending on a frequency of the applied electric field.

In one embodiment, the variable retarder comprises a layer of nematic liquid crystals. In another embodiment, the variable retarder comprises a liquid crystal polymer.

The variable retarder is placed, for example, in a light path in a Liquid Crystal On Silicon (LCOS) High Definition (HD) Television. In one embodiment, two variable retarders are disposed in light paths of the LCOS HDTV.

The present invention may also be embodied in various methods utilizing a variable retarder or other aspects of the present invention. In one embodiment, the present invention is a method comprising the steps of building a prism assembly comprising at least one adjustable retarder material disposed in a pathlength of a light beam of the prism assembly, adjusting the light beam to with in a tolerance of a desired pathlength using the adjustable retarder, and permanently fixing the improved pathlength.

The variable retarder is, for example, a variable retarder cell comprising a liquid crystal polymer, and the step of permanently fixing comprises inducing polymerization of the liquid crystal polymer.

Portions of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a drawing of a variable retarder fixed in position according to an embodiment of the present invention.

DESCRIPTION OF THE PREFERRED EMBODIMENTS

In part, the present invention is based on the desirability of attaching LCOS microdisplays directly to the faces of the prism assembly. Direct attachment prevents microdisplay movement and the possibility of subsequent misalignment. In addition, providing TV manufacturers a light management system in the form of a kernel is highly desirable in that it makes fabrication of the light engine simpler and less expensive. A further point is that it is also desirable that the process used to mount microdisplays onto the faces of the prism assembly not require mechanical Z-axis adjustment. The reason is that this greatly simplifies the attachment equipment and process.

The present invention is described using specific kernel terminology and configurations as an example (e.g., For reference, the reader is directed to Detro et al., U.S. Pat. No. 6,999,237, which was issued on Feb. 14, 2006 and entitled "Method and Apparatus for Configuration and Assembly of a Video Projection Light Management System," filed Jul. 24, 2002, the contents of which are incorporated herein by reference in their entirety).

Figure 1:
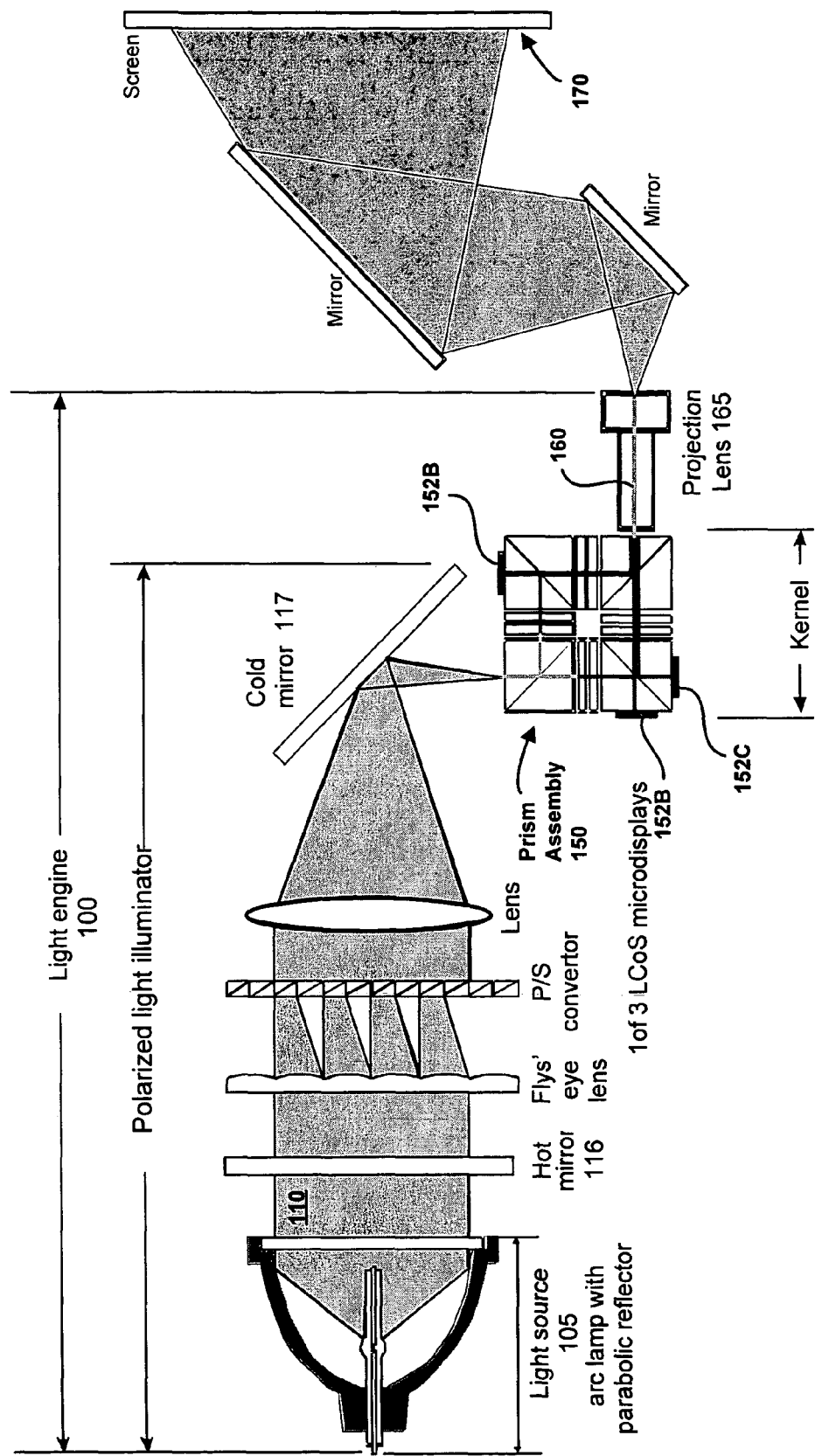
FIG. 1 is a drawing of a generic Liquid Crystal on Silicon (LCOS) light engine.
Figure 2:
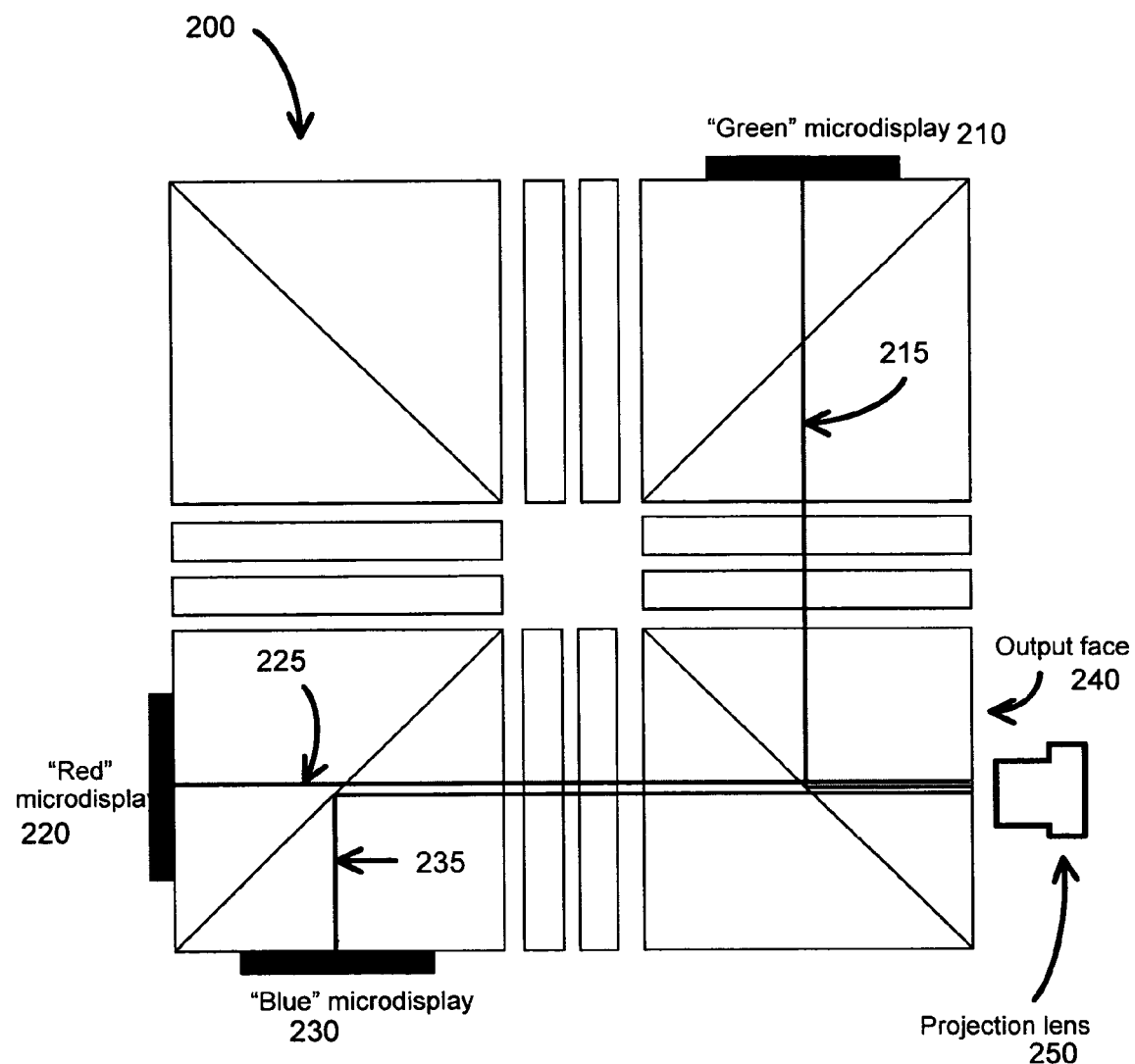
FIG. 2 is a drawing of an example of output paths of light channels within a reflective microdisplay based kernel.

In order to directly mount microdisplays onto the faces of this prism assembly without the need for mechanical Z-axis adjustment, the prism assembly and kernel are pathlength controlled. The concept of a pathlength controlled LCOS kernel 200 is illustrated in FIG. 2. In a pathlength controlled kernel the optical distance from the display surface of each microdisplay to the output face 240 of the prism assembly must be accurately controlled (or fixed) to a target value (e.g., optical path distances 215, 225, and 235 are set or controlled to meet, or be within a specified tolerance of, a target value for each pathlength). Controlled pathlengths are utilized to place all three microdisplays simultaneously in focus at a rear focal points of the projection lens (each color generally has its own particular focal point).

Producing perfectly pathlength controlled kernels presents a practical challenge in the fabrication of prototypes let alone in high volume manufacturing. Detro et al. proposes a possible arrangement to produce desired pathlengths in the prism assembly which is then used to produce a kernel. It is also worth noting that variations in the pathlengths of the kernel may occur as a consequence of material and manufacturing tolerances.

The desired pathlengths each have a target value and a tolerance within which each pathlength falls in order for each microdisplay (or color light beam carrying the microdisplay's modulations) to be focused at the proper point for the projection lens (e.g., the back of the projection lens). The proper point will generally vary for each color light beam/microdisplay combination. The greater the tolerance in the pathlengths, the greater the required range of acceptable input to the back of the projection lens. The design of a projection lens becomes progressively more difficult as the requirement for acceptable range increases. Furthermore, the accuracy with which the projection lens must be assembled and to which it must be positioned within the light engine increases as the target value tolerances increase.

In sum, the greater the target value tolerances to which the kernel pathlengths are controlled, the more expensive the projection lens and the more difficult the assembly of the light engine. The present invention provides a device and method by which optical pathlengths in a LCOS or other kernel may be controlled or brought to the target values within an acceptable and cost effective tolerance for a particular design (design of the prism assembly, kernel, and/or projection lens). The inventions disclosed in this document are electronically adjustable devices to control and/or fix the pathlengths and minimize deviations from specified target values.

Figure 3:
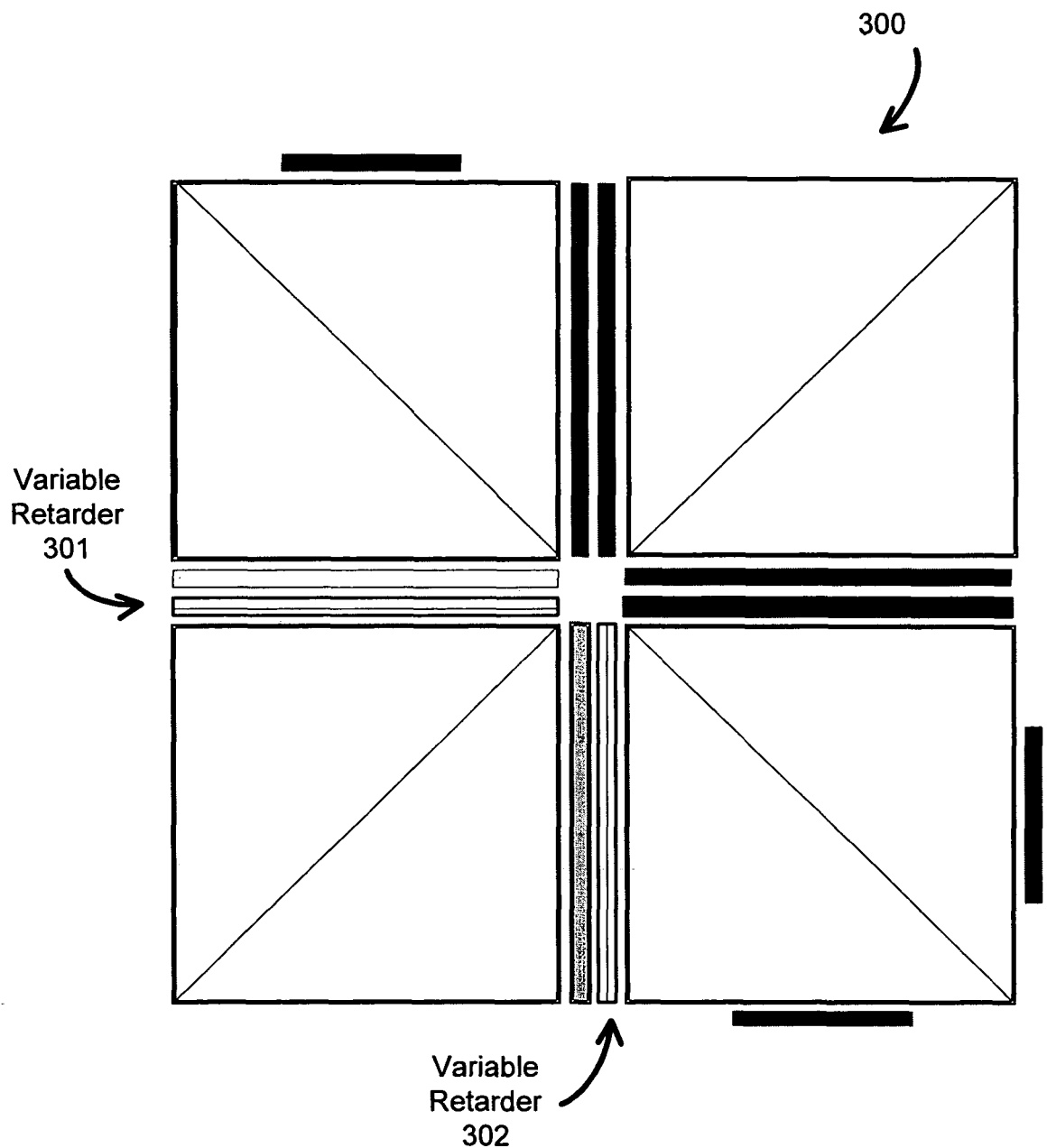
FIG. 3 is a drawing of a kernel including retarder devices according to an embodiment of the present invention.

Referring again to the drawings, wherein like reference numerals designate identical or corresponding parts, and more particularly to FIG. 3 thereof, there is illustrated a drawing of a kernel including retarder devices according to an embodiment of the present invention. A variable retarder has been placed in an output channel or output light path in the kernel (e.g., replacing a spacer glass in the previous design). The light path may be, for example, any of the green and/or red/blue output channels. In FIG. 3, variable retarder 301 is placed in a single color channel (e.g., green channel), and variable retarder 302 has been placed in a combined color channel (e.g., red and blue channel) of kernel 300. Depending on the design (see below), adjustment of one or both variable retarders 301, 302 can be made to either increase or decrease the optical pathlengths of the channels in which they are placed. In this way, pathlength differences between the green and red/blue channels (or any other combination of light channels in a particular design) can be minimized.

Figure 4:
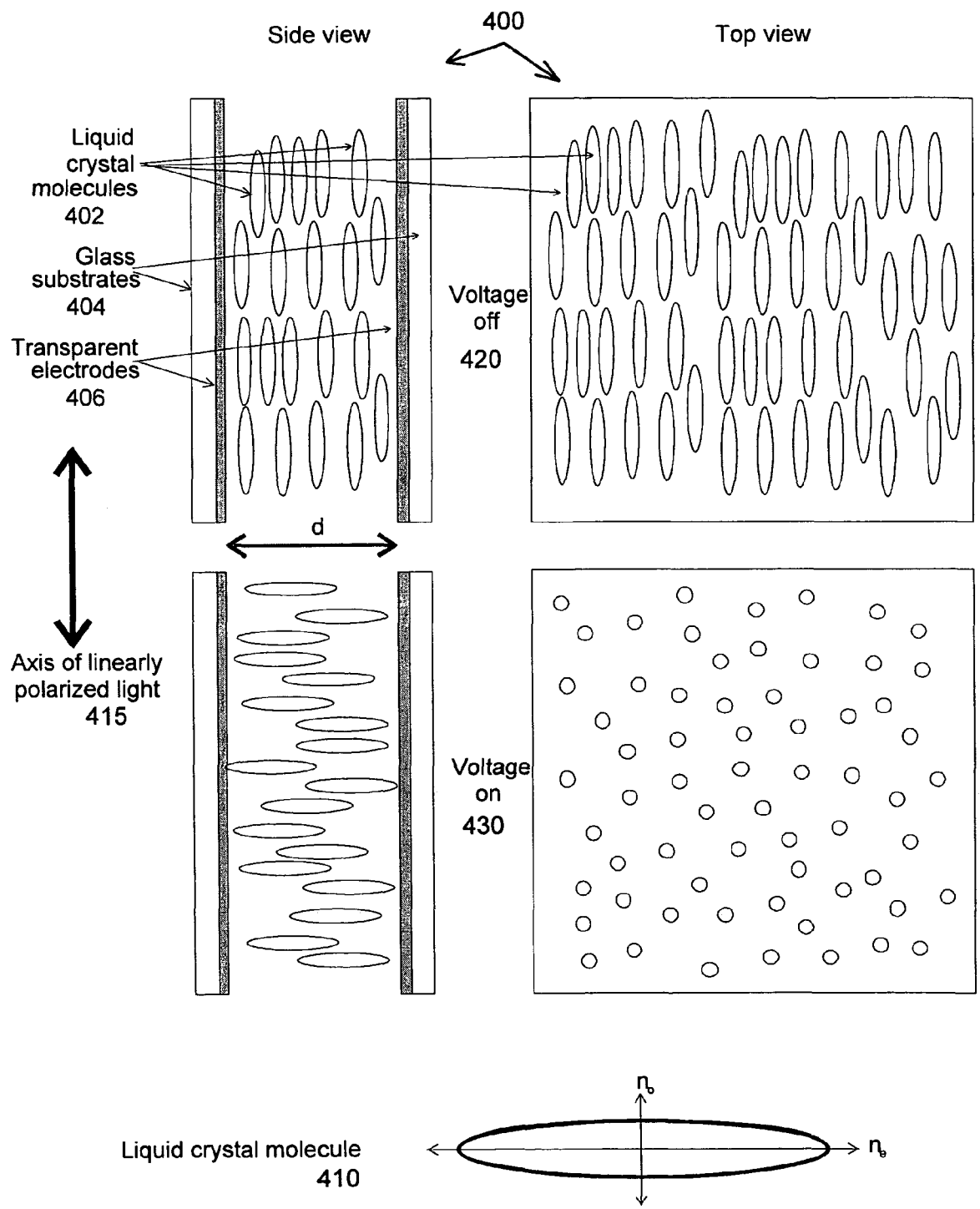
FIG. 4 is a drawing of an example variable retarder according to an embodiment of the present invention.

An example of one possible variable retarder 400 according to the present invention is illustrated in FIG. 4. The variable retarder 400 comprises a plurality of liquid crystal molecules 402 disposed between two substrates 404. The substrates 404 are, for example, transparent glass. Electrodes 406 are placed in proximity to the liquid crystal molecules 402. In one embodiment, as show, the electrodes are transparent electrodes, one each along an interior wall of substrates 404. The electrodes provide the ability to apply power, or apply an electric field, to the liquid crystal molecules 402.

In the unpowered state (e.g. Voltage Off 420), long axes of the nematic liquid crystal molecules are aligned parallel to a plane of the substrates by surface alignment forces. The type of nematic utilized in this device has, for example, a positive dielectric constant such that the application of an electric field causes a long axis of the molecules (e.g., see detail of liquid crystal molecule 410) to rotate and align parallel to the applied electric field (e.g., Voltage On 430). Other liquid crystal configurations can provide the same optical effects.

Note that the liquid crystal molecules are birefringent, that is, have two indices of refraction. The index of refraction for light polarized along the long axis is $n_e$. The index for light polarized perpendicular to the long axis is $n_o$. $n_e$ is>$n_o$. This means that when the variable retarder is unpowered light polarized as indicated in the figure (see axis of linearly polarized light 415) will encounter $n_e$ as it travels through the device and experience an optical pathlength of $d/n_e$. d is the physical thickness of the liquid crystal layer. When the variable retarder is fully energized the polarized light encounters $n_o$ and experiences an optical pathlength of $d/n_o$. When the applied voltage is between 0 and the maximum value, intermediate optical pathlengths are experienced. Utilizing this type of variable retarder in the kernel allows adjustment by increasing the optical pathlength of a light channel in which the variable retarder is inserted. For example, the variable retarder may be inserted in a green channel, increasing the optical pathlength of the green channel with respect to the red/blue channel or vice versa. Note that in this type of variable retarder the voltage needs to be continuously applied to sustain a desired retardation other than the Voltage Off 420 retardation.

There exist nematic liquid crystal materials in which the sign of the dielectric anisotropy changes as a function of applied frequency. The frequency at which this occurs is called the critical frequency ($f_{crit}$). When a voltage below the critical frequency is applied, the long axes of the nematic molecules align parallel to the applied field. When a voltage above the critical frequency is applied, the long axes of the nematic molecules align perpendicular to the applied field. This property can be utilized by constructing a variable retarder in which the long axes of the liquid crystal molecules are, for example, at an angle of 45 degrees to the substrates when unpowered.

Figure 5:
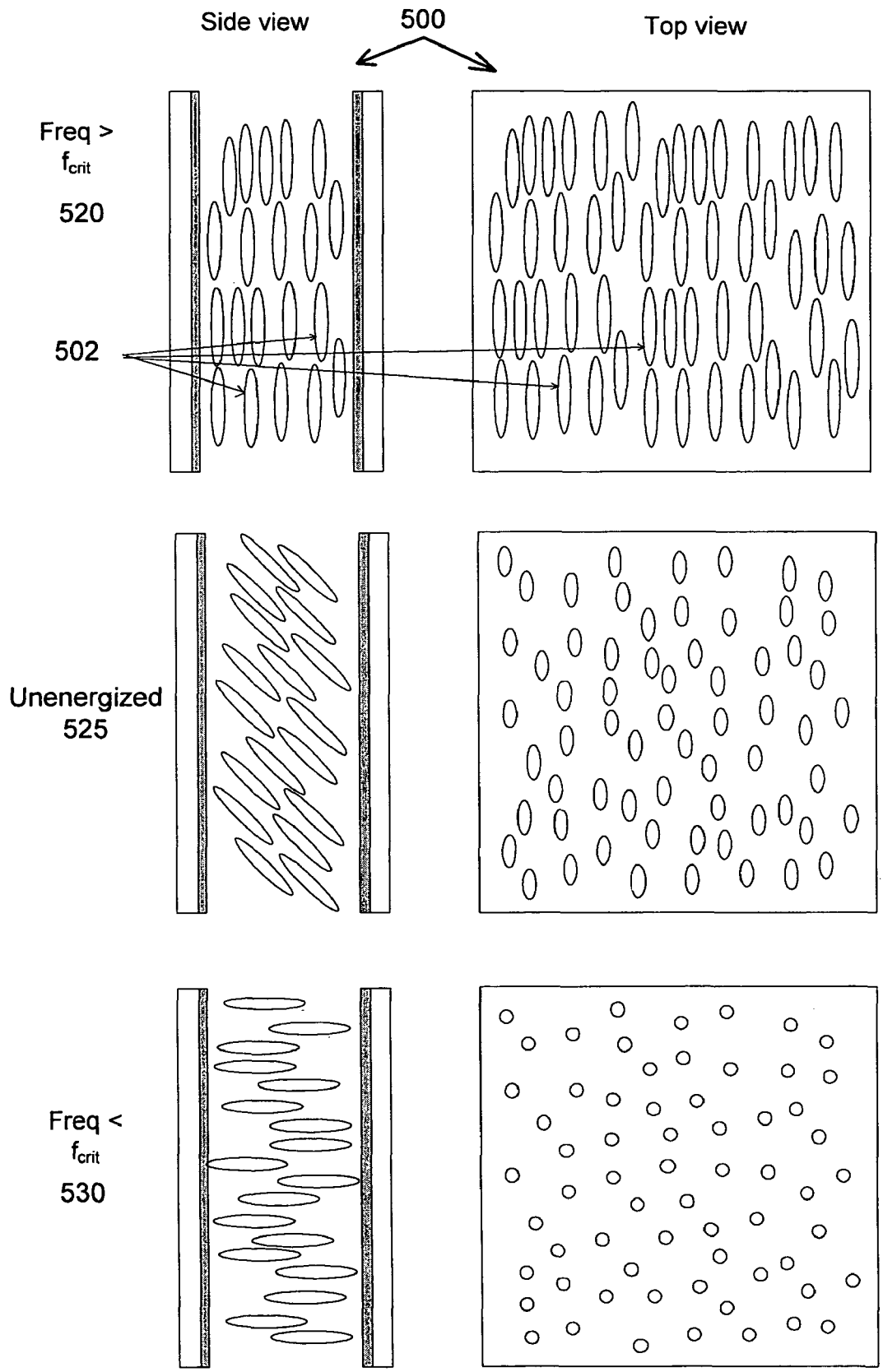
FIG. 5 is a drawing of another example variable retarder according to an embodiment of the present invention.

FIG. 5 is a drawing of another example of a variable retarder 500 according to an embodiment of the present invention. In this case, nematic liquid crystals 502 are a type of crystals in which the sign of dielectric anisotropy of the crystals changes as a function of an applied electric frequency (energization). In an unenergized state 525, the nematic liquid crystals are oriented at an angle to the illustrated substrates and effect a moderate amount of retardation on light passing through the retarder 500 (in the example embodiments, light through the retarder passes at right angles to the plane of each substrate). Application of an electric field having a frequency below $f_{crit}$ 530 (a low frequency voltage) causes the nematic liquid crystals 502 to align perpendicular to the substrates and the optical pathlength through the retarder to increase. The application of a high frequency voltage (with a frequency>$F_{crit}$ 520) causes the nematic liquid crystals to align parallel to the substrate and for the optical pathlength through the retarder to decrease. Utilizing this type of variable retarder in the kernel allows adjustment by either increasing or decreasing the optical pathlength(s) of any light channel(s) in which the variable retarder is placed (e.g., either the green and/or red/blue channels described above).

Another alternative is to fill the variable retarder cell with a Liquid Crystal Polymer. FIG. 6 is a drawing of a variable retarder 600 fixable and fixed in a position according to an embodiment of the present invention. The variable retarder cell is filled with a Liquid Crystal Polymer comprising molecules 602. The retardation of variable retarder 600 is controlled as in one of the nematic cells discussed above with the possible addition that it may need to be accomplished at a somewhat elevated temperature. The retardation is controlled, for example, by the application of a specific amount of voltage (e.g., voltage Es) applied to create an electric field affecting molecules 602 (e.g., polymer liquid crystals). The electric field causes molecules 602 to align relative to the electric field. The alignment, the retardation, and a corresponding optical pathlength of the retarder cell, are changed by applying more or less voltage. Once the desired optical pathlength of the variable retarder is determined and the corresponding appropriate Es value applied to the electrodes, the variable retarder is illuminated, for example, with UV light inducing polymerization of the polymer and fixing the retardation into the cell without the need for a sustaining voltage (e.g., see Polymerized cell 630). The sustaining voltage is removed resulting in the variable retarder being fixed with a desired optical pathlength.

In one embodiment, a kernel is constructed using one or more of the variable retarders according to the present invention. The kernel is placed in a light engine of, for example, a projection television, monitor, or other video projection device. A test pattern is displayed by the video projection device and an electric field (either voltage or frequency based) is applied to produce the best result for a displayed test pattern. The electric field is, for example, varied until the best result is obtained. The best result is analyzed by viewing the displayed test pattern with either a trained human eye or an electronic eye coupled with programming to analyze the test pattern and vary the applied electric field until the best result is determined. The values (e.g., voltage and/or frequency) of the applied electric field are then either saved in an electrical circuit, or in data and/or programming. In the embodiments using liquid crystal polymer, a polymerization element (e.g., UV light) is applied fixing the liquid crystal polymer(s), after which the applied electric field is removed. In one embodiment, removable electrodes operating from outside the substrates but in close proximity to the variable retarder cell applies the electric field, and, after fixing the molecular position (e.g., via polymerization), the electrodes are removed.

Although the present invention has been described herein with reference to prism assemblies and particularly 3 channel prism assemblies, the devices and processes of the present invention may be applied to many other prism assembly designs and optical devices utilizing precision pathlengths.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a glass substrate, any other equivalent device, such as plastics or any other materials or devices having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to waveplates, polymers, nematic liquid crystals, molecules, substrates, electrodes, programming, light engines, kernels, and prism assemblies, etc should also be consider in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CDRW+/−, micro-drive, and magneto-optical disks, ROMs, RAMs, EPROMs, EEPROMs, DRAMs, VRAMs, flash memory devices (including flash cards, memory sticks), magnetic or optical cards, MEMS, nanosystems (including molecular memory ICs), RAID devices, memory sticks, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, application of test patterns, analysis of images and/or light and the display, storage, or communication of results according to the processes of the present invention.

The present invention may suitably comprise, consist of, or consist essentially of, any of element (the various parts or features of the invention, e.g., substrates, polymers, electrodes, variable retarder materials, kernels, and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An optical device, comprising:
    a kernel, comprising:
        a prism assembly including a plurality of beam splitters and a plurality of processing faces, the prism assembly configured to separate an input light into a plurality of light beams each one of the plurality of light beams corresponding to and individually directed to one of the plurality of processing faces and recombine the plurality of light beams after modulation into an output light beam;
        a plurality of reflective microdisplays each one of the plurality of microdisplays individually mounted on a corresponding one of the plurality of processing faces and each microdisplay configured to modulate the light beam corresponding to the processing face on which the microdisplay is mounted; and
        at least one variable retarder including a variable retarder material disposed in at least one optical path of at least one of the plurality of light beams, such that the at least one of the plurality of light beam passes through the at least one variable retarder, wherein the at least one variable retarder includes two or more variable retarders disposed in the plurality of light beams and wherein a first variable retarder is adjusted to increase a lightpath length and a second variable retarder is adjusted to decrease a lightpath length.

2. The optical device according to claim 1, wherein the variable retarder material has a variable retardation, wherein the variable retardation is adjusted by an electric field applied to the variable retarder material.

3. The optical device according to claim 1, further comprising an electric field generation device disposed in close proximity to the variable retarder and configured to exert an electric field on the variable retarder material to adjust the variable retardation of the variable retarder material.

4. The optical device according to claim 3, wherein the applied electric field has an adjustable frequency.

5. The optical device according to claim 4, wherein the adjustable frequency is adjustable about a critical frequency of liquid crystal molecules in the variable retarder material.

6. The optical device according to claim 3, wherein the applied electric field has a variable voltage.

7. The optical device according to claim 1, further comprising at least two variable retarders each one of the at least two variable retarders are disposed in a optical path of at least one of the plurality of light beams and each one of the at least two variable retarders are configured to set corresponding specific pathlengths of the corresponding light beams, such that the corresponding light beams pass through the corresponding one of the at least two variable retarders.

8. The optical device according to claim 7, wherein the corresponding specific pathlengths of the corresponding light beams are equalized pathlengths offset by achromatic differences expected at a projection lens of the optical device.

9. The optical device according to claim 1, wherein the variable retarder comprises a layer of nematic liquid crystals.

10. The optical device according to claim 9, wherein the nematic liquid crystals have a dielectric anisotrophy characteristic that changes according to an applied frequency.

11. The optical device according to claim 1, wherein the optical device is a Liquid Crystal On Silicon (LCOS) High Definition (HD) Television.

12. The optical device according to claim 1, wherein a first of the variable retarders is disposed in a green light beam and a second of the variable retarders is disposed in a combined red and blue light beam.

13. The optical device according to claim 1, wherein a first of the variable retarders is disposed in a combined red and blue light beam and the second of the variable retarders is disposed in a green light beam.

14. A method, comprising the steps of:
    building a prism assembly comprising two or more variable retarders disposed in an optical path, the optical path having a pathlength of a light beam of the prism assembly, wherein the light beam passes through the two or more variable retarders;
    adjusting the light beam to an improved pathlength using the two or more variable retarders wherein a first variable retarder is adjusted to increase a lightpath length and a second variable retarder is adjusted to decrease a lightpath length; and
    permanently fixing the improved pathlength.

15. The method according to claim 14, wherein at least one of the two or more variable retarders comprises a variable retarder cell including a liquid crystal polymer; and
    the step of permanently fixing includes inducing polymerization of the liquid crystal polymer.

16. The optical device according to claim 1, wherein the variable retarder includes:
    a first substrate;

a second substrate; and the variable retarder material disposed between the first substrate and the second substrate.

17. The optical device according to claim 16, wherein the variable retarder material is set to a fixed retardation value.

18. The optical device according to claim 16, wherein the variable retarder material is set to a fixed retardation value by inducing polymerization of a liquid crystal polymer in the variable retarder material.

19. The optical device according to claim 16, wherein the variable retarder material includes birefringent liquid crystal molecules.

20. The optical device according to claim 16, wherein the variable retarder material includes liquid crystal molecules and wherein each liquid crystal molecule includes an axis, and wherein an orientation of the axis of the liquid crystal molecules is variable by an applied electric field.

21. The optical device according to claim 16, wherein the variable retarder equalizes a first light pathlength passing through the variable retarder with a reference value.

22. The optical device according to claim 21, wherein the reference value is a second light pathlength.

* * * * *